(12) United States Patent
Watanabe

(10) Patent No.: US 11,618,093 B2
(45) Date of Patent: Apr. 4, 2023

(54) CONTROLLING WIRE ELECTRICAL DISCHARGE DURING THE MACHINING PROCESS

(71) Applicant: FANUC CORPORATION, Minamitsuru-gun (JP)

(72) Inventor: Daiki Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 16/863,482

(22) Filed: Apr. 30, 2020

(65) Prior Publication Data
US 2020/0353549 A1 Nov. 12, 2020

(30) Foreign Application Priority Data
May 10, 2019 (JP) .............................. JP2019-089583

(51) Int. Cl.
| | | |
|---|---|---|
| G05B 19/41 | (2006.01) | |
| B23H 7/02 | (2006.01) | |
| B23H 7/20 | (2006.01) | |
| G05B 19/4155 | (2006.01) | |

(52) U.S. Cl.
CPC ................. B23H 7/20 (2013.01); B23H 7/02 (2013.01); G05B 19/4155 (2013.01); G05B 2219/45221 (2013.01)

(58) Field of Classification Search
None
See application file for complete search history.

(56) References Cited

U.S. PATENT DOCUMENTS 4,002,885 A * 1/1977 Bell, Jr. ............. G05B 19/4067
  219/69.16
4,029,929 A * 6/1977 Rietveld .................. B23H 7/06
  219/69.12

(Continued)

FOREIGN PATENT DOCUMENTS

| EP | 3560647 A2 * | 10/2019 | ............... B23H 1/00 |
| EP | 3685947 A1 * | 7/2020 | ............... B23H 1/00 |

(Continued)

OTHER PUBLICATIONS

Ho et al., "State of the art in wire electrical discharge machining (WEDM)", Oct. 2003, International Journal of Machine Tools & Manufacture 44 (2004) 1247-1259. (Year: 2003).*

(Continued)

*Primary Examiner* — Mohammad Ali
*Assistant Examiner* — Kelvin Booker
(74) *Attorney, Agent, or Firm* — McGinn IP Law Group, PLLC

(57) ABSTRACT

A wire electrical discharge machine includes: a drive controller configured to periodically apply voltage pulses between a workpiece and a wire electrode while relatively moving the wire electrode relative to the workpiece according to a machining program and a machining condition; a code analyzer configured to analyze the presence or absence of a condition change code for changing the machining condition in the machining program; and a condition changer configured to change the machining condition in accordance with a ratio indicated in the condition change code when the condition change code is present.

20 Claims, 4 Drawing Sheets

(56) References Cited

U.S. PATENT DOCUMENTS

| | | | | |
|---|---|---|---|---|
| 4,078,163 | A * | 3/1978 | Bell, Jr. | B23H 7/04 700/162 |
| 4,940,871 | A * | 7/1990 | Watanabe | B23H 7/10 219/69.12 |
| 5,045,663 | A * | 9/1991 | Neal | B23H 7/101 219/69.12 |
| 5,589,086 | A * | 12/1996 | Sawada | B23H 7/18 219/69.16 |
| 5,854,459 | A * | 12/1998 | Buhler | B23H 7/02 219/69.12 |
| 6,225,589 | B1 * | 5/2001 | Bartok | B23H 7/265 219/69.15 |
| 6,549,824 | B1 * | 4/2003 | Satou | G05B 19/41875 700/162 |
| 6,980,879 | B2 * | 12/2005 | Kurihara | B23H 7/04 219/69.11 |
| 7,039,490 | B2 * | 5/2006 | Kurihara | B23H 7/04 700/162 |
| 8,476,547 | B1 * | 7/2013 | Reed | B23H 11/003 219/69.12 |
| 9,446,466 | B2 * | 9/2016 | Arakawa | G05B 19/4163 |
| 2003/0080094 | A1 * | 5/2003 | Imai | B23H 7/30 219/69.11 |
| 2005/0269296 | A1 * | 12/2005 | Arakawa | B23H 7/20 219/69.18 |
| 2008/0017615 | A1 * | 1/2008 | Yoneda | B23H 7/04 219/69.16 |
| 2013/0062318 | A1 * | 3/2013 | Ebashi | B23H 7/04 219/69.13 |
| 2013/0150999 | A1 * | 6/2013 | Arakawa | B23H 7/065 700/162 |
| 2018/0015556 | A1 * | 1/2018 | Hada | B23H 7/10 |
| 2018/0021869 | A1 * | 1/2018 | Nishikawa | B23H 7/08 700/162 |
| 2018/0126473 | A1 * | 5/2018 | Yamane | B23H 7/101 |
| 2018/0210889 | A1 * | 7/2018 | Yoshida | G06F 16/2425 |
| 2018/0311752 | A1 * | 11/2018 | Oosawa | B23H 11/003 |
| 2018/0326523 | A1 * | 11/2018 | Tomioka | B23H 7/20 |

FOREIGN PATENT DOCUMENTS

| | | | | |
|---|---|---|---|---|
| EP | 3708285 | A1 * | 9/2020 | ............... B23H 1/00 |
| JP | H02-077903 | A | 3/1990 | |
| JP | H05-21690 | B2 | 3/1993 | |
| JP | H05-111798 | A | 5/1993 | |
| JP | H05-220626 | A | 8/1993 | |
| JP | 1996-106737 | A * | 4/1996 | ............... B23H 7/02 |
| KR | 2002-0029965 | A * | 5/2002 | ............... B23H 7/02 |

OTHER PUBLICATIONS

Ho et al., "State of the art electrical discharge machining (EDM)", Jun. 2003, International Journal of Machine Tools & Manufacture 43 (2003) 1287-1300. (Year: 2003).*

Mahapatra et al., Optimization of wire electrical discharge machining (WEDM) process parameters using Taguchi method, Jun. 2005, Int J Adv Manuf Technol (2007) 34:911-925. (Year: 2005).*

Mysinski et al., "Application of Fuzzy Logic for a Gap-Width Controller Used in Electro-Discharge Machining", Sep. 2016, 2016 International Conference on Signals and Electronic Systems (ICSES). (Year: 2016).*

Bai et al., "A Novel Detecting and Controlling Strategy of the Discharge Status in High Speed Wire Electrical Discharge Machining", IEEE 2009. (Year: 2009).*

Japanese Office Action, dated Jul. 26, 2022, in Japanese Application No. 2019-089583.

* cited by examiner

FIG. 3

```
O0391 (10X10 ROUGH)
O0391 (10X10 ROUGH) ;
G92 X0 Y0 ;
 ;
 ;
 ;
 ;
 ;
[M130 P6] ;
 ;
 ;
G41 G91 G01 Y6. ;
G04 X10. ;
/ M31 ;
/ G41 Y-0.5 R0.2 ;
M73 P100 ;
X-4. R0.2 ;
Y10. R0.2 ;
X10. R0.2 ;
Y-10. R0.2 ;
X-4. R0.2 ;
M73 P99 ;
/ G40 Y0.5 ;
/ G04 X10. ;
G40 G01 Y-2.5 ;
 ;
M70 ;
M30 ;
%
```

CONTROLLING WIRE ELECTRICAL DISCHARGE DURING THE MACHINING PROCESS

CROSS-REFERENCE TO RELATED APPLICATION

This application is based upon and claims the benefit of priority from Japanese Patent Application No. 2019-089583 filed on May 10, 2019, the contents of which are incorporated herein by reference.

BACKGROUND OF THE INVENTION

Field of the Invention

The present invention relates to a wire electrical discharge machine and a wire electrical discharge machining method for machining a workpiece by generating electric discharge at a discharge gap between the workpiece and a wire electrode.

Description of the Related Art

The wire electrical discharge machine machines a workpiece based on a machining program and machining conditions. In Japanese Patent Publication No. 05-021690, machining conditions are input in accordance with the workpiece, the outer diameter of the wire electrode and others, and stored into a storage unit, whereby the workpiece is machined based on the machining conditions.

SUMMARY OF THE INVENTION

In the configuration of Japanese Patent Publication No. 05-021690, there occur cases where the wire electrode is broken due to various factors such as aging of the machine, even under the machining conditions suitable for the workpiece, the outer diameter of the wire electrode and others. When the wire electrode is broken, the operator should examine the cause of the wire breakage and adjust the machining conditions based on the examined result.

However, experience is sometimes needed in order to appropriately adjust the machining conditions, and therefore the time taken for adjustment of the machining conditions tends to vary depending on the skill of the operator.

It is therefore an object of the present invention to provide a wire electrical discharge machine and a wire electrical discharge machining method capable of easily adjusting machining conditions.

According to the first aspect of the present invention, a wire electrical discharge machine for machining a workpiece by generating electric discharge at a discharge gap between the workpiece and a wire electrode, includes: a drive controller configured to periodically apply voltage pulses between the workpiece and the wire electrode while relatively moving the wire electrode relative to the workpiece according to a machining program and a machining condition; a code analyzer configured to analyze the presence or absence of a condition change code for changing the machining condition in the machining program; and a condition changer configured to change the machining condition in accordance with a ratio indicated in the condition change code when the condition change code is present.

According to the second aspect of the present invention, a wire electrical discharge machining method for machining a workpiece by generating electric discharge at a discharge gap between the workpiece and a wire electrode, includes: a drive control step of periodically applying voltage pulses between the workpiece and the wire electrode while relatively moving the wire electrode relative to the workpiece according to a machining program and a machining condition; a code analysis step of analyzing the presence or absence of a condition change code for changing the machining condition in the machining program; and a condition changing step of changing the machining condition in accordance with a ratio indicated in the condition change code when the condition change code is present.

Thus, the present invention makes it possible to save time and labor for the operator to adjust the machining conditions related to wire breakage, and enables the operator to easily adjust the machining conditions.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing a part of a machining program; and

DESCRIPTION OF THE PREFERRED EMBODIMENTS

The present invention will be detailed below by describing a preferred embodiment with reference to the accompanying drawings.

EMBODIMENT

Figure 1:
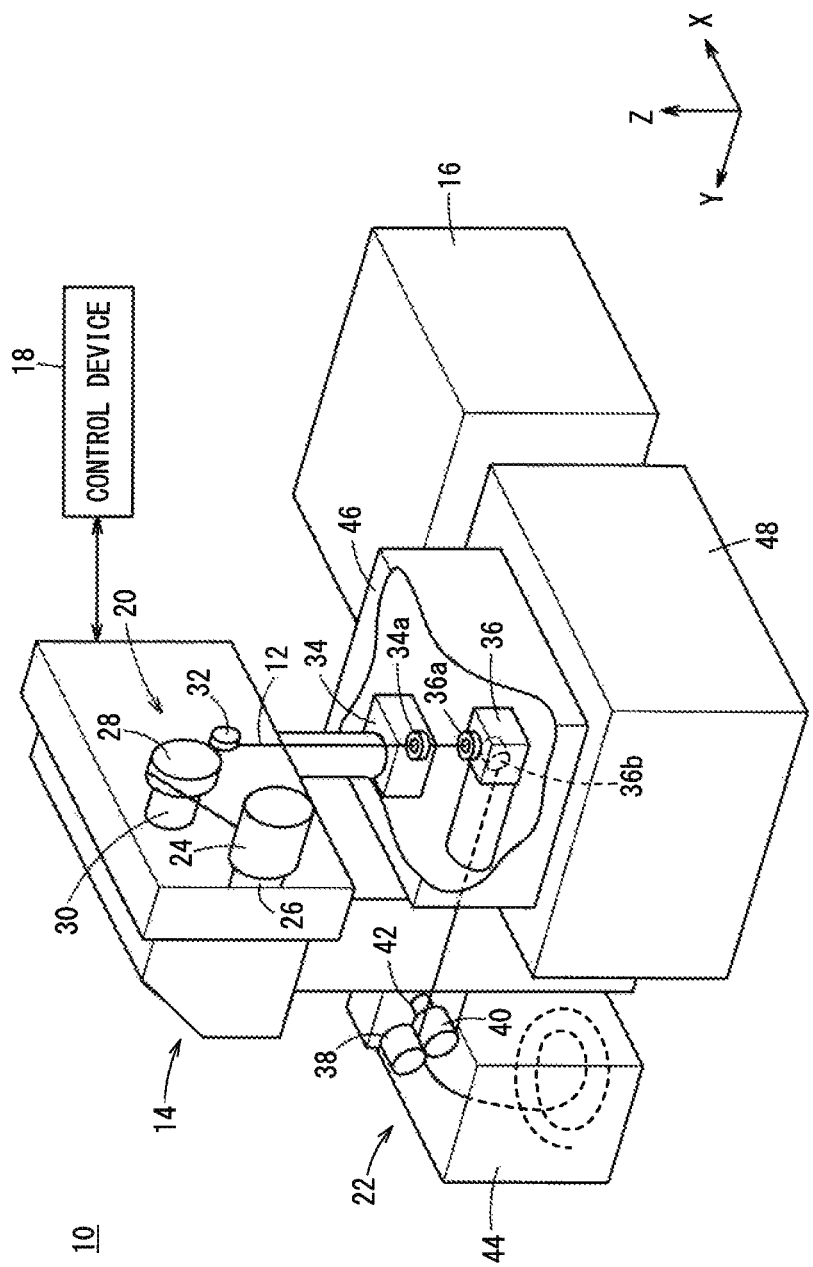
FIG. 1 is a schematic diagram showing an overall configuration of a wire electrical discharge machine.

The overall configuration of the wire electrical discharge machine 10 will be described with reference to FIG. 1. In FIG. 1, the axes of the wire electrical discharge machine 10 are shown as an X-axis direction, a Y-axis direction and a Z-axis direction. Note that the X-axis direction, the Y-axis direction and the Z-axis direction are orthogonal to each other.

The wire electrical discharge machine 10 is a machine tool that machines a workpiece W (FIG. 2) with a wire electrode 12. The wire electrical discharge machine 10 applies voltage between the workpiece W (FIG. 2) and the wire electrode 12 in a dielectric working fluid to generate electric discharge at a discharge gap between the workpiece W and the wire electrode 12 to thereby machine the workpiece W. The wire electrical discharge machine 10 includes a main machine body 14, a dielectric fluid unit 16, and a control device 18.

The wire electrode 12 is formed of, for example, metal material such as tungsten-based, copper-alloy-based and brass-based material. On the other hand, the material of the workpiece W is, for example, metal material such as iron-based material or superhard material (tungsten carbide).

The main machine body 14 includes a supplying system 20 that supplies the wire electrode 12 toward the workpiece W (workpiece, object to be machined), and a collecting system 22 that collects the wire electrode 12 that has passed through the workpiece W.

The supplying system 20 includes a wire bobbin 24 on which a fresh (unused) wire electrode 12 is wound, a torque motor 26 that applies a torque to the wire bobbin 24, a brake shoe 28 for applying a braking force to the wire electrode 12 by friction, a brake motor 30 for applying a brake torque to the brake shoe 28, a tension detector 32 for detecting the magnitude of the tension of the wire electrode 12, and a die guide (upper die guide) 34 for guiding the wire electrode 12 at a position above the workpiece W. The torque motor 26 and the brake motor 30 are provided with encoders for detecting the rotational position or the rotational speed. The control device 18 performs feedback control of the torque motor 26 and the brake motor 30 based on detection signals detected by the encoders so that the rotational speeds of the torque motor 26 and the brake motor 30 coincide with respective given rotational speeds.

The collecting system 22 includes a die guide (lower die guide) 36 for guiding the wire electrode 12 at a position below the workpiece W, a pinch roller 38 and a feed roller 40 capable of holding and sandwiching the wire electrode 12 therebetween, a torque motor 42 for applying a torque to the feed roller 40, and a collection box 44 for collecting the used wire electrodes 12 conveyed by the pinch roller 38 and the feed roller 40. The torque motor 42 is provided with an encoder that detects the rotational position or the rotational speed. The control device 18 performs feedback control of the torque motor 42 based on the detection signal detected by the encoder so that the rotational speed of the torque motor 42 coincides with a predetermined rotational speed.

The main machine body 14 includes a work-pan 46 capable of storing a dielectric working fluid such as deionized water or oil used for machining. The work-pan 46 is mounted on a base 48. Die guides 34 and 36 are arranged in the work-pan 46, and the workpiece W is placed between the die guides 34 and 36. The die guides 34 and 36 have respective support blocks 34a and 36a for supporting the wire electrode 12. The die guide 36 includes a guide roller 36b that guides the wire electrode 12 to the pinch roller 38 and the feed roller 40 by changing the traveling direction of the wire electrode.

The die guide 34 jets (ejects) a clean dielectric working fluid free from sludge (machining waste, chips), toward the discharge gap formed between the wire electrode 12 and the workpiece W. This makes it possible to fill the discharge gap with the clean working fluid suitable for machining, and to prevent a reduction in machining accuracy which would otherwise be caused by sludge generated during machining. In addition, the die guide 36 may also jet a clean dielectric working fluid free from sludge, toward the gap.

The workpiece W is supported by a table 52 (FIG. 2) movable along the X-axis and Y-axis. The die guides 34 and 36, the workpiece W, and the table 52 are immersed in the working fluid stored in the work-pan 46.

The dielectric fluid unit 16 is a device that removes machining waste or chips (sludge) generated in the work-pan 46 and controls the liquid quality of the working fluid by adjusting electric resistivity, temperature, etc. The working fluid whose liquid quality is controlled by the dielectric fluid unit 16 is returned to the work-pan 46, and is ejected from at least the die guide 34. The control device 18 controls the main machine body 14 and the dielectric fluid unit 16.

Figure 2:
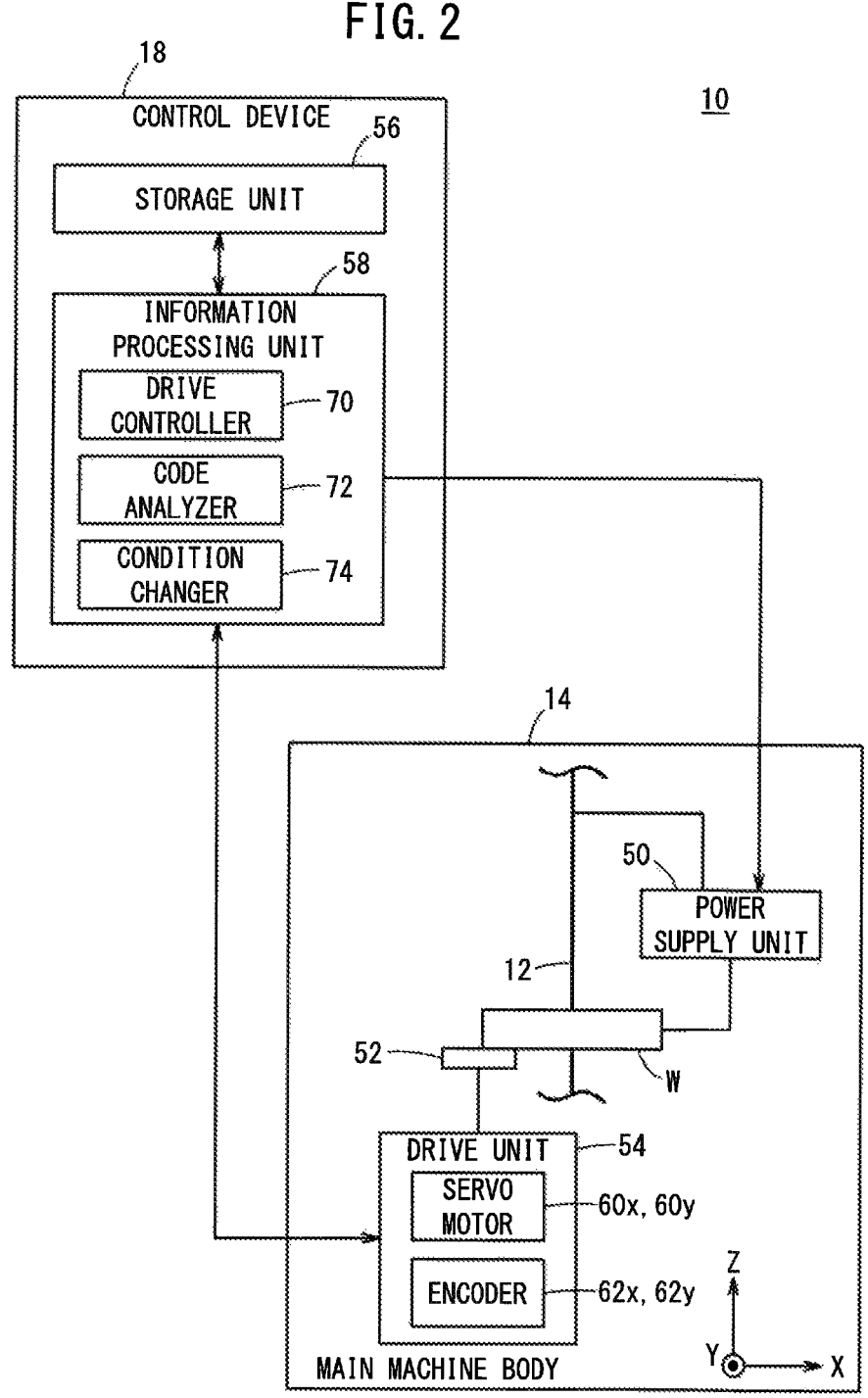
FIG. 2 is a block diagram showing a configuration of a machining control system of a wire electrical discharge machine.

Next, the configuration of the machining control system of the wire electrical discharge machine 10 will be described with reference to FIGS. 2 and 3. The main machine body 14 includes a power supply unit 50, the table 52, and a drive unit 54, as shown in FIG. 2. On the other hand, the control device 18 includes a storage unit 56 and an information processing unit 58.

The power supply unit 50 periodically and repeatedly applies voltage pulses to the workpiece W and the wire electrode 12, based on drive pulse signals. The table 52 is a table to which the workpiece W is fixed, and is provided to be movable in each of the X-axis and Y-axis directions.

The drive unit 54 has servo motors $60x$ and $60y$, a driving force transmission mechanism (not shown), and a driver (not shown). The servo motor $60x$ outputs a driving force for moving the table 52 in the X-axis direction, and the servo motor $60y$ outputs a driving force for moving the table 52 in the Y-axis direction. The driving force transmission mechanism transmits the driving forces output from the servo motors $60x$ and $60y$ to the table 52. The driver drives the servo motors $60x$ and $60y$.

In the present embodiment, the drive unit 54 moves the table 52 to thereby move the wire electrode 12 relative to the workpiece W. Instead, the drive unit 54 may move the die guides 34 and 36 to thereby move the wire electrode 12 relative to the workpiece W.

The servo motor $60x$ is provided with an encoder $62x$ for detecting the amount of driving of the servo motor $60x$, and the servo motor $60y$ is provided with an encoder $62y$ for detecting the amount of driving of the servo motor $60y$. The encoders $62x$ and $62y$ generate detection signals indicating the amount of driving, and output the generated detection signals to the information processing unit 58.

The storage unit 56 is a storage medium capable of storing various kinds of information. The storage unit 56 stores at least a machining program and machining conditions for machining the workpiece W. The machining conditions include a voltage value of the voltage pulse applied between the workpiece W and the wire electrode 12, the pulse interval between voltage pulses, the relative movement speed of the wire electrode 12 to the workpiece W, and others.

The pulse interval is a time period between voltage pulses, and is a pause time during which no voltage is applied between the workpiece W and the wire electrode 12. The relative movement speed of the wire electrode 12 relative to the workpiece W is a speed at which the wire electrode 12 is moved relative to the workpiece W.

The information processing unit 58 processes various kinds of information, and includes a processor such as a CPU. When the processor executes the machining program stored in the storage unit 56, the information processing unit 58 functions as a drive controller 70, a code analyzer 72, and a condition changer 74.

The drive controller 70 controls the main machine body 14 based on the machining program and the machining conditions. When controlling the main machine body 14, the drive controller 70 loads the machining program from the storage unit 56. When the machining program is loaded, the drive controller 70 reads, from the storage unit 56, the machining conditions specified by the loaded machining program, and controls the power supply unit 50 and the drive unit 54 using the read machining conditions.

When controlling the power supply unit 50, the drive controller 70 reads out, at least, the voltage value of the voltage pulse applied between the wire electrode 12 and the workpiece W, and the pulse interval between the voltage pulses, as the machining conditions specified by the machining program. In this case, the drive controller 70 generates a drive pulse signal based on the voltage value of the voltage pulse, the pulse interval, etc., and outputs the generated drive pulse signal to the power supply unit 50. Thus, the drive controller 70 causes the power supply unit 50 to periodically apply a voltage pulse to the wire electrode 12 and the workpiece W.

When controlling the drive unit 54, the drive controller 70 reads, at least, the relative movement speed of the wire electrode 12 relative to the workpiece W as the machining condition specified by the machining program. In this case, the drive controller 70 generates a movement control signal based on the relative movement speed, a machining path specified by the machining program, etc., and outputs the generated movement control signal to the driver of the drive unit 54. Thus, the drive controller 70 causes the driver of the drive unit 54 to move the wire electrode 12 relative to the workpiece W fixed to the table 52.

The code analyzer 72 analyzes whether or not there exists, in the machining program, a condition change code for changing the machining conditions. In the present embodiment, the type of the condition change code is of an M code. The M code is a code for indicating a command or the like for assisting machining. The type of the condition change code may be other than the M code.

In the machining program, when a change in machining conditions is requested, a portion surrounded by a broken line is written, as shown in FIG. 3. That is, the condition change code includes a code number and a value indicating a ratio (or a percentage, a proportion). In the example shown in FIG. 3, "M130" is assigned as a code number, and "P6" is described as a value indicating a ratio. "P6" means a ratio of 60%.

When recognizing a specific code number ("M130") in the machining program loaded by the drive controller 70, the code analyzer 72 determines that there is a condition change code. On the other hand, when the code analyzer 72 does not recognize any specific code number ("M130"), the analyzer determines that there is no condition change code even if the analyzer recognizes other code numbers. In the example shown in FIG. 3, "M30", "M31", "M70" and "M73" are described as the other code numbers.

When there is a condition change code in the machining program, the condition changer 74 changes the machining conditions according to the ratio indicated by the condition change code. In the present embodiment, the pulse interval (pause time) between voltage pulses is applied as the machining condition.

In the example of FIG. 3, the condition changer 74 adds, to the initial value, a value that is 60% of the initial value of the pulse interval initially stored in the storage unit 56, and rewrites the current pulse interval stored in the storage unit 56, to a value obtained as a result of the addition, to thereby lengthen the pulse interval. As the pulse interval becomes longer, the amount of voltage applied per unit time decreases, so that the risk of wire breakage can be suppressed.

In this way, in the present embodiment, the condition changer 74 changes the pulse interval (pause time) of the voltage pulse according to the ratio (percentage) indicated by the condition change code so that the amount of voltage applied per unit time decreases. As a result, it is possible to reduce the risk of wire breakage while saving the time and labor required for the operator to adjust the machining conditions concerning wire breakage.

In the present embodiment, when changing the pulse interval (pause time) of the voltage pulse so as to decrease the amount of voltage applied per unit time, the condition changer 74 also reduces the relative movement speed of the wire electrode 12 in accordance with the ratio indicated by the condition change code. As a result, it is possible to prevent the amount of machining from becoming smaller than the target amount due to a decrease in the amount of voltage applied per unit time. In particular, when the inside of the workpiece W is cut in, it is effective because the cut amount (groove width) can be prevented from becoming smaller or narrower than the target amount.

Figure 4:
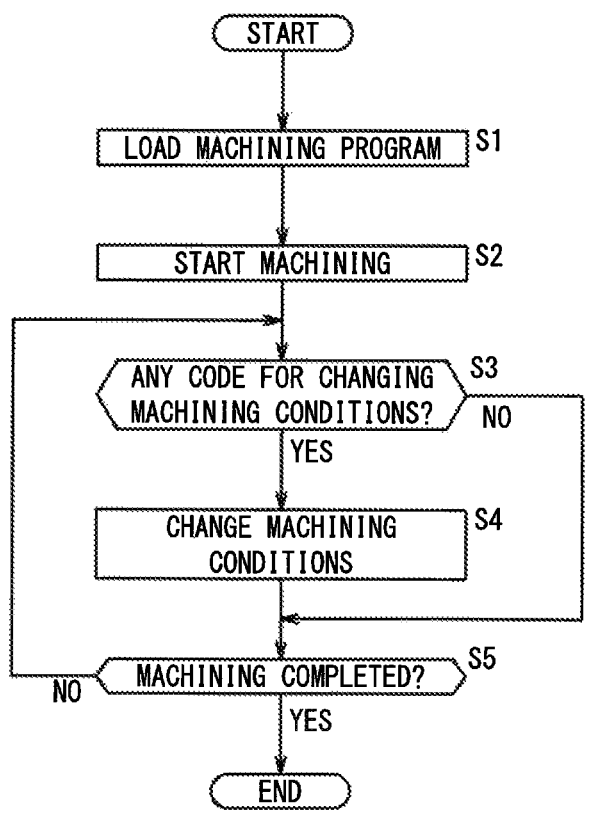
FIG. 4 is a flowchart showing procedural steps of a machining control process.

Next, as to the wire electrical discharge machining method, the machining control process of the control device 18 will be described with reference to FIG. 4. At step S1, the drive controller 70 loads a machining program stored in the storage unit 56. When the drive controller 70 completes loading the machining program, the machining control process proceeds to step S2.

At step S2, the drive controller 70 starts machining the workpiece W based on the machining program and the machining conditions. That is, the drive controller 70 starts moving the wire electrode 12 relative to the workpiece W by the power supply unit 50 based on the machining program and the machining conditions. In addition, the drive controller 70 starts to periodically apply a voltage pulse between the wire electrode 12 and the workpiece W through the drive unit 54 based on the machining program and the machining conditions. When the drive controller 70 starts machining the workpiece W, the machining control process proceeds to step S3.

At step S3, the code analyzer 72 analyzes whether or not there is a condition change code in the machining program. When recognizing a specific code number ("M130"), the code analyzer 72 determines that there is a condition change code. In this case, the machining control process proceeds to step S4. On the other hand, when the code analyzer 72 does not recognize any specific code number ("M130"), the analyzer determines that there is no condition change code. In this case, the machining control process goes to step S5.

At step S4, the condition changer 74 changes the machining conditions stored in the storage unit 56 according to the ratio ("P6") indicated in the condition changing code. In the present embodiment, the condition changer 74 increases the pulse interval (pause time) of the voltage pulse so as to decrease the amount of voltage applied per unit time according to the ratio indicated by the condition change code, and reduces the relative movement speed of the wire electrode 12 according to the ratio. When the condition changer 74 completes changing the machining conditions, the machining control process proceeds to step S5.

At step S5, the drive controller 70 determines whether or not the machining on the workpiece W has been completed. When there still remains unmachined part in the machining paths specified by the machining program, the drive controller 70 determines that the machining of the workpiece W has not been completed. In this case, the machining control process returns to step S3. On the other hand, when there remains no unmachined part in the machining paths specified by the machining program, the drive controller 70 determines that the machining of the machining target W has been completed. In this case, the machining control process is terminated.

MODIFIED EXAMPLES

Modified Example 1

In the above embodiment, the condition changer 74 increases the pulse interval (pause time) of the voltage pulse so that the amount of voltage applied per unit time decreases according to the ratio (percentage) indicated by the condition change code. However, the condition changer 74 may reduce the voltage value of the voltage pulse so that the amount of voltage applied per unit time decreases according to the ratio indicated in the condition changing code.

Further, the condition changer 74 may increase the pulse interval of the voltage pulse and reduce the voltage value of the voltage pulse so that the amount of voltage applied per unit time decreases according to the ratio indicated in the condition change code.

Modified Example 2

In the above embodiment, the condition changer 74 changes the machining conditions so that the amount of voltage applied per unit time decreases according to the ratio indicated by the condition change code. However, as long as the condition changer 74 changes the machining conditions so as to reduce the risk of wire breakage, it is not necessarily required to change the machining conditions so that the amount of voltage applied per unit time decreases.

For example, the condition changer 74 may increase the tension of the wire electrode 12 according to the ratio indicated in the condition changing code. In this case, the amount of voltage applied per unit time does not decrease even if the tension of the wire electrode 12 increases, however the risk of wire breakage can be suppressed. The tension of the wire electrode 12 can be changed by controlling the torque motors 26 and 42 and the brake motor 30.

Modified Example 3

In the above embodiment, 60%, which is a proportion lower than 100%, has been exemplified as the ratio indicated in the condition change code. However, the ratio may be a numeral other than 60%. That is, the ratio may exceed 100%. For example, when the wire electrode 12 that is relatively hard to break is used, the ratio indicated by the condition change code of the machining program may exceed 100%.

When the ratio indicated by the condition change code exceeds 100%, the condition changer 74 shortens the pulse interval (pause time) of the voltage pulse according to the ratio so that the amount of voltage applied per unit time increases. Note that the condition changer 74 may increase the voltage value of the voltage pulse so as to increase the amount of voltage applied per unit time as in the modified example 1, or may decrease the tension of the wire electrode 12 as in the modified example 2.

Modified Example 4

In the above embodiment, the condition changer 74 changes two kinds of machining conditions, i.e., the pulse interval (pause time) of the voltage pulse and the relative movement speed of the wire electrode 12, according to the ratio indicated by the condition change code. However, the condition changer 74 may change only one kind of machining condition, or may change three or more kinds of machining conditions.

Modified Example 5

In the above embodiment, the machining conditions are changed according to a ratio indicated by the condition change code of the machining program and are applied to a series of machining paths specified by the machining program. However, the machining conditions may be changed according to a ratio indicated by the code of the machining program and be applied to a specific section among a series of machining paths specified by the machining program.

In the machining program, a code number ("M130") of the code for changing the machining conditions is described before the description indicating the specific section, and a code number of a return code for returning the machining conditions to those before the change is described after the description indicating the specific section. It is assumed that, for example, "M140" is assigned as the code number of the return code.

In this modified example, the code analyzer 72 analyzes the presence/absence of a condition change code and the presence/absence of a return code (step S3). The analysis of the presence/absence of the return code is the same as the analysis of the presence/absence of the condition change code. That is, when recognizing the code number ("M140") of the return code in the machining program loaded by the drive controller 70, the code analyzer determines that there is a return code. On the other hand, when the code analyzer 72 does not recognize any return code number ("M140"), the analyzer determines that there is no return code.

In this modified example, when only a condition change code is present, the condition changer 74 changes the machining conditions stored in the storage unit 56 in accordance with the ratio ("P6") indicated in the condition change code, as described in the above embodiment (step S4). Accordingly, the machining conditions that have been changed according to the ratio indicated by the condition change code of the machining program are applied to all the machining paths specified by the machining program.

On the other hand, when there is a condition change code and a return code, the condition changer 74 changes the machining conditions stored in the storage unit 56, in a section from the condition change code to the return code. More specifically, the condition changer 74 monitors the drive controller 70 after changing the machining conditions, and when the drive controller 70 has ended the machining control process for the machining paths described before the return code, the condition changer 74 returns the changed machining conditions to the conditions before the change. Therefore, the machining conditions changed according to the ratio indicated in the code of the machining program are applied to a specific section of the series of machining paths specified by the machining program.

As described above, in the present modification, when there is a condition change code and a return code, the condition changer 74 changes the machining conditions, in a section from the condition change code to the return code. As a result, the risk of wire breakage occurring in a specific section such as an approach section of the machining paths specified by the machining program can be reduced.

Modified Example 6

The above embodiment and modified examples may be arbitrarily combined as long as no technical inconsistency occurs.

[Invention Obtained from the Embodiment and Modified Examples]

The inventions that can be grasped from the above-described embodiment and modified examples are described below.

(First Invention)

The first invention is a wire electrical discharge machine (10) for machining a workpiece (W) by generating electric discharge at a discharge gap between the workpiece (W) and a wire electrode (12), including: a drive controller (70) configured to periodically apply voltage pulses between the workpiece (W) and the wire electrode (12) while relatively moving the wire electrode (12) relative to the workpiece (W) according to a machining program and a machining condition; a code analyzer (72) configured to analyze the presence or absence of a condition change code for changing the machining condition in the machining program; and a condition changer (74) configured to change the machining conditions in accordance with a ratio indicated in the condition change code when the condition change code is present.

This makes it possible to save time and labor required for the operator to adjust the machining conditions related to wire breakage, and further makes it possible for the operator to easily adjust the machining conditions.

The condition changer (74) may be configured to change at least one of the pulse interval between the voltage pulses and the voltage value of the voltage pulses so that the amount of voltage applied per unit time decreases. This can reduce the risk of wire breakage.

The condition changer (74) may be configured to lower the relative movement speed of the wire electrode (12) relative to the workpiece (W), together with the change. Thus, it is possible to prevent the amount of machining from being smaller than the target amount due to a decrease in the amount of voltage applied per unit time. In particular, when the inside of the workpiece (W) is cut in, it is effective because the cut amount (groove width) can be prevented from becoming smaller or narrower than the target amount.

The code analyzer (72) may be configured to analyze the presence or absence of the condition change code, and the presence or absence of a return code that returns the changed machining condition to the machining condition before the change, and the condition changer (74) may be configured to change the machining condition in a section from the condition change code to the return code when the condition change code and the return code are present. As a result, the risk of wire breakage occurring in a specific section such as an approach section of the machining paths specified by the machining program can be reduced.

(Second Invention)

The second invention is a wire electrical discharge machining method for machining a workpiece (W) by generating electric discharge at a discharge gap between the workpiece (W) and a wire electrode (12). The method includes: a drive control step (S2) of periodically applying voltage pulses between the workpiece (W) and the wire electrode (12) while relatively moving the wire electrode (12) relative to the workpiece (W) according to a machining program and a machining condition; a code analysis step (S3) for analyzing the presence or absence of a condition change code for changing the machining condition in the machining program; and a condition changing step (S4) of changing the machining condition in accordance with a ratio indicated in the condition change code when the condition change code is present.

This makes it possible to save time and labor required for the operator to adjust the machining conditions related to wire breakage, and further makes it possible for the operator to easily adjust the machining conditions.

The condition changing step (S4) may change at least one of the pulse interval between the voltage pulses and the voltage value of the voltage pulses so that the amount of voltage applied per unit time decreases. This can reduce the risk of wire breakage.

The condition changing step (S4) may lower the relative movement speed of the wire electrode (12) relative to the workpiece (W), together with the change. Thus, it is possible to prevent the amount of machining from being smaller than the target amount due to a decrease in the amount of voltage applied per unit time. In particular, when the inside of the workpiece (W) is cut in, it is effective because the cut amount (groove width) can be prevented from becoming smaller or narrower than the target amount.

The code analysis step (S3) may analyze the presence of absence of the condition change code, and the presence or absence of a return code that returns the changed machining condition to the machining condition before the change, and the condition changing step (S4) may change the machining condition in a section from the condition change code to the return code when the condition change code and the return code are present. As a result, the risk of wire breakage occurring in a specific section such as an approach section of the machining paths specified by the machining program can be reduced.

The wire electrical discharge machine (10) and the wire electrical discharge machining method described above are not limited to the above-described embodiment and modified examples, but may adopt various configurations without departing from the essence and gist of the present invention.

What is claimed is:

1. A wire electrical discharge machine for machining a workpiece by generating electric discharge at a discharge gap between the workpiece and a wire electrode, comprising:
    a drive controller configured to periodically apply voltage pulses between the workpiece and the wire electrode while relatively moving the wire electrode relative to the workpiece according to a machining program and a machining condition;
    a code analyzer configured to analyze presence or absence of a condition change code for changing the machining condition in the machining program; and
    a condition changer configured to change the machining condition in accordance with a ratio indicated in the condition change code when the condition change code is present,
    wherein the condition change code includes a specific code number and an adjustable value indicating the ratio,
    wherein the condition changer, when there is the specific code number, changes the machine condition according to the adjustable value.

2. The wire electrical discharge machine according to claim 1, wherein the condition changer is configured to change at least one of a pulse interval between the voltage pulses and a voltage value of the voltage pulses so that an amount of voltage applied per unit time decreases.

3. The wire electrical discharge machine according to claim 2, wherein the condition changer is configured to lower a relative movement speed of the wire electrode relative to the workpiece, together with the change.

4. The wire electrical discharge machine according to claim 1, wherein:
    the code analyzer is configured to analyze the presence or absence of the condition change code, and presence or absence of a return code that returns the changed machining condition to the machining condition before the change; and
    the condition changer is configured to change the machining condition in a section from the condition change code to the return code when the condition change code and the return code are present.

5. The wire electrical discharge machine according to claim 1, wherein the specific code number in the condition change code is analyzed by the code analyzer to determine if the machining condition is to be changed by the condition changer.

6. The wire electrical discharge machine according to claim 1, wherein the ratio of the condition change code determines in what manner the machine condition is changed by the condition changer.

7. The wire electrical discharge machine according to claim 1, wherein the condition change code for changing the machining condition in the machining program is determined based on a continuous monitoring of the machining conditions, and
wherein the specific code number in the condition change code indicates a type of the condition change code.

8. The wire electrical discharge machine according to claim 1, wherein the condition changer is configured to change a timing of the voltage pulse according to the ratio indicated by the condition change code.

9. The wire electrical discharge machine according to claim 1, wherein the condition changer is configured to change a relative movement speed of the wire electrode in accordance with the ratio indicated by the condition change code.

10. A wire electrical discharge machining method for machining a workpiece by generating electric discharge at a discharge gap between the workpiece and a wire electrode, the method comprising:
a drive control step of periodically applying voltage pulses between the workpiece and the wire electrode while relatively moving the wire electrode relative to the workpiece according to a machining program and a machining condition;
a code analysis step of analyzing presence or absence of a condition change code for changing the machining condition in the machining program; and
a condition changing step of changing the machining condition in accordance with a ratio indicated in the condition change code when the condition change code is present,
wherein the condition change code includes a specific code number and an adjustable value indicating the ratio,
wherein the condition changing a step, when there is the specific code number, changes the machine condition according to the adjustable value.

11. The wire electrical discharge machining method according to claim 10, wherein the condition changing step changes at least one of a pulse interval between the voltage pulses and a voltage value of the voltage pulses so that an amount of voltage applied per unit time decreases.

12. The wire electrical discharge machining method according to claim 11, wherein the condition changing step lowers a relative movement speed of the wire electrode relative to the workpiece, together with the change.

13. The wire electrical discharge machining method according to claim 10, wherein:
the code analysis step analyzes the presence or absence of the condition change code, and presence or absence of a return code that returns the changed machining condition to the machining condition before the change; and
the condition changing step changes the machining condition in a section from the condition change code to the return code when the condition change code and the return code are present.

14. The wire electrical discharge machining method according to claim 10, wherein the specific code number in the condition change code is analyzed by the code analysis step to determine if the machining condition is to be changed by the condition changing step.

15. The wire electrical discharge machining method according to claim 10, wherein the ratio of the condition change code determines in what manner the machine condition is changed by the condition changing step.

16. The wire electrical discharge machining method according to claim 10, wherein the specific code number in the condition change code indicates a type of the condition change code.

17. The wire electrical discharge machining method according to claim 10, wherein the condition changing step changes a timing of the voltage pulse according to the ratio indicated by the condition change code.

18. The wire electrical discharge machining method according to claim 10, wherein the condition changing step changes a relative movement speed of the wire electrode in accordance with the ratio indicated by the condition change code.

19. A wire electrical discharge machine for machining a workpiece by generating electric discharge at a discharge gap between the workpiece and a wire electrode, comprising a computer readable medium storing instructions, and a processor executing the instructions and configured to:
apply voltage pulses between the workpiece and the wire electrode while relatively moving the wire electrode relative to the workpiece according to the instructions and a machining condition;
analyze presence or absence of a condition change code for changing the machining condition in the instructions; and
change the machining condition in accordance with a ratio indicated in the condition change code when the condition change code is present,
wherein the condition change code includes a specific code number and an adjustable value indicating the ratio,
wherein the processor is configured to, when there is the specific code number, change the machine condition according to the adjustable value.

20. The wire electrical discharge machine according to claim 19, wherein the processor is configured to change at least one of a pulse interval between the voltage pulses and a voltage value of the voltage pulses such that an amount of voltage applied per unit time decreases,
wherein the processor is configured to lower a relative movement speed of the wire electrode relative to the workpiece; and
further comprising a drive controller receiving instructions from the processor to apply the voltage pulses between the workpiece and the wire electrode while relatively moving the wire electrode relative to the workpiece according to the instructions and the machining condition.

* * * * *